United States Patent [19]

Gregory et al.

[11] Patent Number: 5,755,862
[45] Date of Patent: May 26, 1998

[54] MONOAZO DYES USEFUL IN INK COMPOSITIONS FOR PRINTING ON SUBSTRATES BY INK-JET PRINTING

[75] Inventors: Peter Gregory; Prakash Patel, both of Manchester, United Kingdom

[73] Assignee: Zeneca Limited, London, England

[21] Appl. No.: 831,951

[22] Filed: Apr. 2, 1997

[30] Foreign Application Priority Data

Apr. 25, 1996 [GB] United Kingdom ............... 9608505

[51] Int. Cl.$^6$ ............................................. C09D 11/02
[52] U.S. Cl. ......................... 106/31.48; 427/394; 8/543
[58] Field of Search ........................ 106/31.48; 427/394; 8/543

[56] References Cited

U.S. PATENT DOCUMENTS

| | | | |
|---|---|---|---|
| 3,197,269 | 7/1965 | Drake et al. | 8/18 |
| 3,787,173 | 1/1974 | Greenshields et al. | 8/1 E |
| 4,583,989 | 4/1986 | Ueda et al. | 8/543 |
| 5,183,501 | 2/1993 | Kawashita et al. | 106/31.48 |

FOREIGN PATENT DOCUMENTS

| | | | |
|---|---|---|---|
| 0 133 270 A1 | 2/1985 | European Pat. Off. | C09B 62/04 |
| 0 489 692 A1 | 6/1992 | European Pat. Off. | C09B 62/503 |
| 0 568 860 A1 | 11/1993 | European Pat. Off. | C09B 62/04 |
| 1 315 333 | 12/1962 | France . | |
| 1 454 196 | 9/1966 | France . | |
| 1 525 597 | 5/1968 | France . | |
| 2 084 024 | 12/1971 | France | C09B 62/00 |
| 2 092 056 | 1/1972 | France | C09B 57/00 |
| 2 208 025 | 12/1974 | France | D06P 1/76 |
| 2 006 279 | 5/1979 | United Kingdom | D06P 5/02 |
| 2 008 145 | 5/1979 | United Kingdom | D06P 1/02 |
| 1 549 134 | 7/1979 | United Kingdom | C09B 62/08 |
| 2 165 556 | 4/1986 | United Kingdom | D06P 5/06 |
| WO 95/25842 | 9/1995 | WIPO | D06P 1/00 |
| WO 96/35012 | 7/1996 | WIPO | D06P 1/00 |

Primary Examiner—Helen Klemanski
Attorney, Agent, or Firm—Pillsbury Madison & Sutro LLP

[57] ABSTRACT

An ink composition comprising
(i) a medium comprising a mixture of water and one or more water-soluble organic solvent(s), an organic solvent, or a low melting point solid; and
(ii) a dye of Formula (1) or salt thereof:

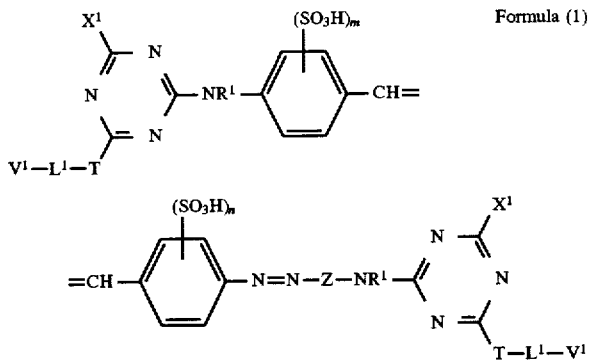

wherein:
- each $X^1$ independently is a labile or non-labile substituent;
- each T independently is —O—, —S— or —NR$^1$—;
- each $L^1$ independently is a divalent organic linker group;
- each $V^1$ independently is a group which is capable of undergoing an addition reaction or an elimination and addition reaction;
- each $R^1$ independently is H or optionally substituted alkyl;
- Z is the residue of a coupling component; and
- m and n are each independently 0 or 1.

Also claimed is a composition comprising the ink and a nucleophilic agent; a process for ink jet printing of a substrate wherein the ink is applied to the substrate using an ink jet printer together with a nucelophilic agent and heating and/or basifying the ink and nucleophilic agent thereby causing the dye present in the ink and the nucleophilic agent to react together; and a toner resin composition comprising a toner resin and a dye of Formula (1).

20 Claims, No Drawings

MONOAZO DYES USEFUL IN INK COMPOSITIONS FOR PRINTING ON SUBSTRATES BY INK-JET PRINTING

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to the present invention there is provided an ink composition comprising:

(i) a medium comprising a mixture of water and one or more soluble solvent(s), an organic solvent, or a low melting point solid; and
(ii) a dye of Formula (1) or salt thereof:

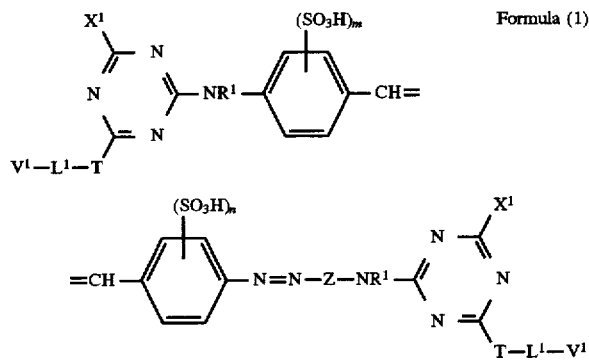

Formula (1)

wherein:
each $X^1$ independently is a labile or non-labile substituent;
each T independently is —O—, —S— or —NR$^1$—;
each $L^1$ independently is a divalent organic linker group;
each $V^1$ independently is a group which is capable of undergoing an addition reaction or an elimination and addition reaction;
each $R^1$ independently is H or optionally substituted alkyl;

Z is the residue of a coupling component; and
m and n are each independently 0 or 1.

The dye of Formula (1) may be in an unionised or free acid form as shown, but is preferably in the form of a salt with one or more cations. Preferred cations are selected from an alkali metal, ammonium and optionally substituted $C_{1-4}$-alkylammonium cations. Preferred alkali metal cations include lithium, sodium and potassium. A preferred $C_{1-4}$-alkylammonium cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl) ammonium and mono-, di, tri- and tetra-(hydroxy$C_{1-4}$-alkyl) ammonium. It is preferred that the dye of Formula (1) is a salt with an $NH_4^+$ cation or a mono- or poly-, methyl- or ethylammonium cation or with a mixture of two or more cations, especially a mixture of alkali metal and optionally substituted ammonium cations. Examples of optionally substituted $C_{1-4}$-alkylammonium cations include mono-, di-, tri- and tetra-methylammonium, mono-, di-, tri- and tetra-ethylammonium and mono-, di-, tri- and tetra-(2-hydroxyethyl)ammonium.

The dye of Formula (1) may be converted wholly or partially into its ammonium or optionally substituted $C_{1-4}$-alkyl ammonium salt by dissolving in water the dye of Formula (1) in the form of a salt with an alkali metal, acidifying the solution with a mineral acid, such as hydrochloric acid, separating the precipitated compound in free acid form, suspending it in water, adjusting the pH of the suspension to 9 to 9.5 with ammonia or an optionally substituted $C_{1-4}$-alkylamine to form the water-soluble ammonium or $C_{1-4}$-alkylammonium salt and removing the alkali metal chloride ions by dialysis. Alternatively the alkali metal ion may be exchanged for an optionally substituted ammonium ion by a conventional ion exchange method.

In $X^1$ the term "labile substituent" means an atom or group attached directly to the triazine ring which is displaceable by the hydroxy group of a cellulosic material under alkaline conditions. A preferred labile atom is a halogen, especially Cl or F. A preferred labile group is sulpho, more preferably a quaternary ammonium group. As examples of quaternary ammonium groups there may be mentioned trialkyl ammonium groups and optionally substituted pyridinium groups, especially 3-carboxypyridinium and 4-carboxypyridinium.

Preferred non-labile substituents represented by each $X^1$ include groups of formula —$OR^2$, —$SR^2$ or —$NR^2R^3$ in which $R^2$ and $R^3$ each independently is H, optionally substituted alkyl, cycloalkyl, optionally substituted alkenyl, optionally substituted aryl, optionally substituted aralkyl, or $R^2$ and $R^3$ together with the nitrogen atom to which they are attached form a 5 or 6 membered ring.

Especially preferred non-labile groups represented by each $X^1$ include OH; SH; alkoxy, for example methoxy or ethoxy; hydroxy-$C_{2-4}$-alkylamino, for example mono or di-(2-hydroxyethyl)amino; morpholinyl; piperidinyl; piperazinyl; 4-(hydroxy-$C_{2-4}$-alkyl)-piperazin1-yl, for example 4-hydroxyethylpiperazin-1-yl; 4-($C_{1-4}$-alkyl)piperazin-1-yl; for example 4-methylpiperazin-1-yl; $C_{1-6}$-alkylamino, for example dimethylamino, n-butylamino or n-hexylamino; carboxy-$C_{1-4}$-alkylamino, for example 2-carboxymethylamino; arylamino, for example phenylamino, mono-3- or di-3,5-carboxyanilino; or sulpho-$C_{1-6}$-alkylthio, for example $HO_3S(CH_2)_2S$- and $HO_3S(CH_2)_3S$-. When $X^1$ is alkoxy it preferably contains from 1 to 4 carbon atoms.

$R^2$ and $R^3$ each independently is preferably selected from H, $C_{1-10}$-alkyl especially $C_{1-4}$-alkyl, substituted $C_{1-10}$-alkyl especially substituted $C_{1-4}$-alkyl, phenyl, substituted phenyl, $(CH_2)_{1-4}$-phenyl and substituted $(CH_2)_{1-4}$-phenyl especially benzyl and substituted benzyl. When any one of $R^2$ or $R^3$ is substituted, the substituent is preferably selected from —OH, —$CH_3$, —$OCH_3$, —$SO_3H$ and —$CO_2H$. When $R^2$ and $R^3$ together with the nitrogen atom to which they are attached form a 5- or 6-membered ring, this is preferably morpholine, piperidine or piperazine especially the latter in which the free ring N-atom may be, and preferably is, substituted by a $C_{1-4}$-alkyl or hydroxy-$C_{2-4}$-alkyl group.

Preferably each T independently is —$NR^1$- wherein $R^1$ is as hereinbefore defined.

The divalent organic linker group represented by each $L^1$ is preferably an optionally substituted or interrupted alkylene group containing from 2 to 10 carbon atoms, especially $C_{2-4}$-alkylene, or more preferably an optionally substituted $C_{6-11}$-arylene group, more preferably optionally substituted phenylene or naphthylene.

Preferred groups represented by $V^1$ which are capable of undergoing an addition reaction or an elimination and addition reaction are as described in International Patent Application No. PCT/GB93/02344, page 6, line 13 to page 8, line 18, which is included herein by reference thereto. Preferably each $V^1$ independently is a vinyl sulphone group or a group which is convertible to a vinyl sulphone group on treatment with an aqueous alkali, or a group of formula —$SO_2NHCH_2CH_2$—Y wherein Y is —$OSO_3H$, —$SSO_3H$, —Cl or —$OCOCH_3$.

Each $R^1$ is preferably H or $C_{1-4}$-alkyl, especially H, methyl or ethyl.

The residue of a coupling component represented by Z is preferably an optionally substituted buta-1,3-dione, phenylene, naphthylene or heterocyclic group (for example a pyrazolone), more preferably Z is optionally substituted 1,3- or 1,4-phenylene.

When $L^1$, Z or $R^1$ is substituted it is preferred that each substituent is selected from amino, alkyl preferably $C_{1-4}$-alkyl, alkoxy preferably $C_{1-4}$-alkoxy, amido preferably —$NHCOC_{1-4}$-alkyl, cyano, ureido, sulpho, carboxy, hydroxy, nitro and halo.

Preferably m and n have a value of 1. When m and n are 1 it is preferred that the sulpho groups shown in Formula (1) and in Formula (2) below are both ortho with respect to the —CH=CH— group.

A preferred dye of Formula (1) is of Formula (2) or a salt thereof:

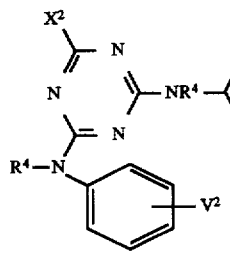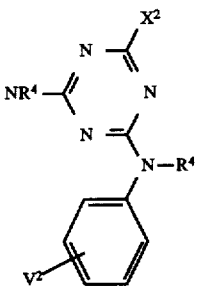

Formula (2)

wherein:
each $R^4$ independently is H or $C_{1-4}$-alkyl;
G is H, alkyl, alkoxy, amido, ureido, halo, nitro, carboxy, amino or sulpho;
each $X^2$ independently is F, Cl, a quaternary ammonium group or a non labile group; and
each $V^2$ independently is a vinyl sulphone group or a group which is convertible to a vinyl sulphone group on treatment with aqueous alkali, a group of formula —$SO_2NHCH_2CH_2$—Y wherein Y is —$OSO_3H$, —$SSO_3H$, —Cl or —$OCOCH_3$, or a group of formula —$NHCOCR^4$=$CH_2$ or —$NHCOCBr$=$CH_2$.

G is preferably H, $C_{1-4}$-alkyl, $C_{1-4}$-alkoxy, -$NHCOC_{1-4}$-alkyl or ureido, more preferably H, methyl, methoxy, ureido or —$NHCOCH_3$.

Each $X^2$ is preferably independently F, Cl or a quaternary ammonium group.

The $V^2$ groups shown in Formula (2) are preferably at the 3- or 4- position relative to the —$NR^4$-group.

Groups which are convertible to a vinyl sulphone group, (—$SO_2CH$=$CH_2$), on treatment with aqueous alkali include —$SO_2CH_2CH_2OSO_3H$, —$SO_2CH_2CH_2SSO_3H$, —$SO_2CH_2CH_2OCOCH_3$ and —$SO_2CH_2CH_2Cl$.

The ink composition preferably contains from 0.5% to 20%, more preferably from 0.5% to 15%, and especially from 1% to 3%, by weight of the dye based on the total weight of the ink. Although many ink compositions contain less than 5% by weight of dye, it is desirable that the dye has a solubility of around 10% or more to allow the preparation of concentrates which may be used to prepare more dilute inks and to minimise the chance of precipitation of dye if evaporation of the medium occurs during storage of the ink. It is preferred that the dye is dissolved completely in the medium to form a solution.

When the liquid medium is a mixture of water and one or more water-soluble organic solvent(s), the weight ratio of water to water-soluble organic solvent(s) is preferably 99:1 to 1:99, more preferably from 99:1 to 50:50 and especially from 95:5 to 80:20. The water-soluble organic solvent(s) is preferably selected from $C_{1-4}$-alkanol for example methanol, ethanol, n-propanol, isopropanol, n-butanol, sec-butanol, tert-butanol or isobutanol; cyclic alkanols, for example cyclohexanol and cyclopentanol; amides, for example dimethylformamide and dimethylacetamide; ketones and ketone-alcohols, for example acetone or diacetone alcohol; ethers, for example tetrahydrofuran or dioxane; oligo- or poly-alkyleneglycols, for example diethylene glycol, triethylene glycol, polyethylene glycol or polypropylene glycol; alkyleneglycols or thioglycols containing a $C_2$-$C_6$-alkylene group, for example ethylene glycol, propylene glycol, butylene glycol, pentylene glycol, hexylene glycol and thiodiglycol; polyols, for example glycerol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol; heterocyclic ketones, for example 2-pyrrolidone and N-methyl-2-pyrrolidone; and mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, for example ethyleneglycol, diethyleneglycol, triethyleneglycol; lower alkyl ethers of polyhydric alcohols, for example 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

When the medium comprises a mixture of water and one or more water-soluble organic solvent(s), it preferably also contains humectant to inhibit evaporation of water and preservative to inhibit the growth of fungi, bacteria and/or algae in the solution. Examples of suitable humectants are propan-1,2-diol, butan-1,2-diol, butan-2,3-diol and butan-1,3-diol.

Examples of further suitable ink media are given in U.S. Pat. Nos. 4,963,189, 4,703,113, 4,626,284 and EP 425150A which are incorporated herein by reference thereto.

Where the liquid medium is an organic solvent, the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 1 25° C. Suitable low melting point solids include long chain fatty acids and alcohols, preferably those with $C_{18-24}$ chains, or sulphonamides. The dye may be dissolved in the low melting point solid or may be finely dispersed in it.

It is preferred that the medium comprises a mixture of water and one or more water- soluble organic solvent(s), especially water and from one to ten, more especially one to five water-soluble organic solvents.

The inks may optionally contain other components conventionally used in inks for ink jet printing. For example, viscosity and surface tension modifiers, corrosion inhibitors, kogation reducing additives, and surfactants which may be ionic or non ionic.

A particularly preferred ink composition comprises:
(a) 0.5 to 20 parts of the dye;
(b) 2 to 60 parts of water-soluble organic solvent(s); and
(c) 1 to 95 parts water;
wherein all parts are parts by weight based upon the total weight of the ink and the parts (a)+(b)+(c)=100.

In addition to the parts (a), (b) and (c) the ink may contain other additional components conventionally used in ink formulations as hereinbefore defined.

According to a second aspect of the present invention there is provided a process for printing a substrate with an ink composition using an ink jet printer, characterised in that the ink composition is as defined in the first aspect of the present invention.

A suitable process for the application of an ink compositions as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

Preferred substrates include overhead projector slides, metal, plastics, glass, paper, including plain and treated papers, which may have an acid, alkaline or neutral character or textile materials, especially natural, synthetic or semi-synthetic materials.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

The preferred ink composition used in the process is as hereinbefore described for the first aspect of the present invention.

According to a third aspect of the present invention there is provided a paper, an overhead projector slide or a textile material printed with an ink composition according to the first aspect of the present invention, or by means of the process according to the second aspect of the present invention.

According to a fourth aspect of the present invention there is provided a process for the coloration of a textile material with an ink composition according to the first aspect of the present invention which comprises the steps:
i) applying the ink composition to the textile material by ink jet printing; and
ii) heating the textile material at a temperature from 50° C. to 250° C. to fix the dye on the material.

The process for coloration of a textile material by ink jet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to the ink jet printing in step i) above.

The pre-treatment composition preferably comprises an solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the formation of a covalent bond between the dye and the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes.

Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate for example MATEXIL™ FC-PN (available from ICI), which have a strong affinity for the textile material and the dye, even dye which has been rendered unreactive by hydrolysis of the reactive group, and thus increase the fixation of the dye on the textile material.

Examples of anti-migration agents are low molecular weight acrylic resins, for example polyacrylates, such as poly(acrylic acid) and poly(vinyl acrylate).

A preferred feature of the present process is that the pre-treatment composition also contains such a tertiary amine. Any tertiary amine may be used, but a preferred tertiary amines are substantially odourless compounds such as 1,4-diazabicyclo[2.2.2]octane (DABCO) and substituted pyridines, preferably carboxypyridines, and especially those in which the pyridine ring is substituted by a carboxylic acid group in the 3 or 4 position, such as nicotinic or isonicotinic acid.

However, when further agents are added to the pre-treatment composition, care must be taken to balance their effects and to avoid interactions with the other ingredients of the composition.

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material -by any suitable drying procedure such as by exposure to hot air or direct heating, for example by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the reactive group is labile even in neutral environment, hydrolysis of the reactive group on the dye in the aqueous composition and during the fixation can be inhibited by use, as humectant, of a glycol or mixture of glycols, in which not more than one hydroxy group is a primary hydroxy group. Examples of suitable humectants are, propan-1,2-diol, butan-1,2-diol, butan-2,3-diol and butan-1,3- diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pre-treated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the dye and the fibre and thereby to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pre-treatment and dye compositions may be removed from the textile material by a washing sequence, involving a series of hot and cold washes in water and aqueous detergent solutions before the textile material is dried.

According to a fifth aspect of the present invention there is provided a textile material, especially a natural, synthetic and semi-synthetic textile material, coloured with an ink composition according to the first aspect of the present invention or by means of the process according to the fourth aspect of the present invention.

In a further feature of the present invention we have found that ink compositions according to the first aspect of the present invention can be applied to substrates in conjunction with a nucleophilic agent to give high levels of colour and good fastness to water.

According to a sixth feature of the present invention there is provided a process for the coloration of a substrate comprising applying to the substrate:
(i) an ink composition according to the first aspect of the present invention using an ink jet printer; and
(ii) a nucleophilic agent; and heating and/or basifying the ink and nucleophilic agent thereby causing the dye present in the ink and the nucleophilic agent to react together.

The nucleophilic agent preferably contains at least 1, more preferably at least two, groups selected from thiols, thiones, aliphatic primary amino groups and aliphatic secondary amino groups. These groups are believed to react with the groups represented by $V^1$ in dyes of Formula (1) to give a highly substantive species which has a strong affinity for substrates and low solubility in water.

The thiol group which may be present in the nucleophilic agent may, for example, be present in a substituent of formula —CO—SH or —NH—CO—SH.

The thione group which may be present in the nucleophilic agent is of the formula =S, for example as found in —PS(—OH)$_2$ and —O—PS(—OH)$_2$ and —O—PS(—OH)$_2$. A preferred thione group is of the formula >C=S, for example the agent may have a —CS—OH, —CS—NH$_2$, —NH—CS—OH or thiourea substituent. Preferred thione groups are of the formula —NR$^5$—CS—NR$^5$R$^5$ or —NR$^5$—CS—NR$^5$— wherein each R$^5$ independently is H, optionally substituted alkyl or optionally substituted aryl provided at least one R$^5$ is H. Preferably R$^5$ is H, optionally substituted C$_{1-4}$-alkyl or optionally substituted phenyl. When R$^5$ is substituted, preferred substituents are as hereinbefore defined for L$^1$, Z and R$^1$.

In one embodiment of the invention the nucleophilic agent has a quaternary amine group, in addition to the one or more groups selected from thiols, thiones, aliphatic primary amino groups and aliphatic secondary amino groups. The quaternary amine group can in many cases increase affinity of the nucleophilic agent for substrates such as paper and cotton leading to stronger coloration and higher wet fastness. Examples of quaternary amine groups include dialkyl phenyl ammonium, for example Ph(CH$_3$)$_2$N+—, Ph(CH$_3$CH$_2$)$_2$N+—; optionally substituted pyridinium, for example 2-, 3- and 4-methyl pyridinium, 2-, 3-, 4- carboxy pyridinium; N-alkyl-pyridinyloxy, for example N-methyl-4-pyridinyloxy, N- niethyl-2-pyridinyloxy and N-ethyl-4-pyridinyloxy; tri(alkyl)ammonium, for example (CH$_3$)$_3$N$^+$—, (CH$_3$CH$_2$)$_3$N$^+$—, CH$_3$(CH$_3$CH$_2$)$_2$N$^+$—; (CH$_2$)$_5$N$^+$—; (CH$_2$CH$_2$OCH$_2$CH$_2$)N$^+$—; and those derived from quinuclidine and diazobicyclo octane.

The thiol or thione group which may be present in the nucleophilic agent can be attached to a heterocyclic ring, preferably a 5 or 6 membered ring containing 1, 2 or 3 atoms selected from nitrogen, oxygen and sulphur, to give what are hereinafter referred to as heterocyclic thiol or thione groups respectively. The preferred heterocyclic thiol or thione group contains 1, 2 or more preferably 3 nitrogen atoms. Preferred heterocyclic thiol or thione groups carry 1 or 2 groups selected from —SH and =S. Examples of heterocyclic thiols and thiones include groups of Formula (3) and (4):

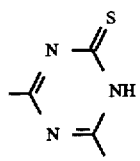

Formula (3)

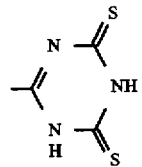

Formula (4)

The groups of Formula (3), Formula (4) and the thioureas may exist in tautomeric forms other than those illustrated and these are included in the present invention. By way of illustration tautomers of groups of Formula (3) include those illustrated below by 5 Formulae (3a) and (3b) and tautomers of groups of Formula (4) include those illustrated by (4a), (4b), (4c) and (4d):

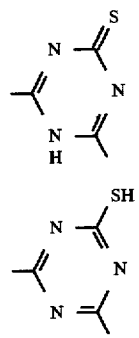

Formula (3a)

Formula (3b)

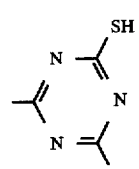

Formula (4a)

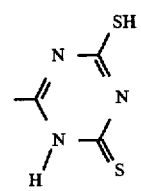

Formula (4b)

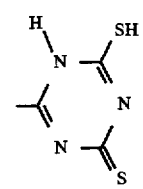

Formula (4c)

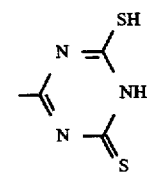

Formula (4d)

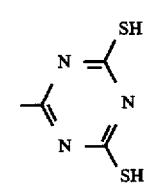

The nucleophilic agent is preferably a triazine compound having 1, 2 or 3 groups selected from thiols and thiones, especially trithiotriazine (i.e. s-triazine having three —SH groups) or a compound of the formula:

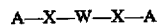

A—X—W—X—A wherein:
each A is a group of Formula (4) as hereinbefore defined;
each X independently is oxygen, sulphur or —NR$^6$—;
each R$^6$ independently is H or alkyl; and
W is a divalent organic linker group.
R$^6$ is preferably H or C$_{1-4}$-alkyl.

W is preferably an alkylene, arylene or aralkylene group. The preferred alkylene group is optionally substituted C$_{2-4}$-alkylene. The preferred arylene group is optionally substituted phenylene or naphthylene. The preferred aralkylene group is optionally substituted benzylene or xylylene. When W is substituted the substituent(s) are preferably selected from halo, especially chloro; nitro; alkoxy, especially C$_{1-4}$-alkoxy; alkyl, especially C$_{1-4}$-alkyl; cyano; hydroxy; —SH; amino; W may contain or be free from chromophores.

Another preferred nucleophilic agent is of Formula (5) or (6):

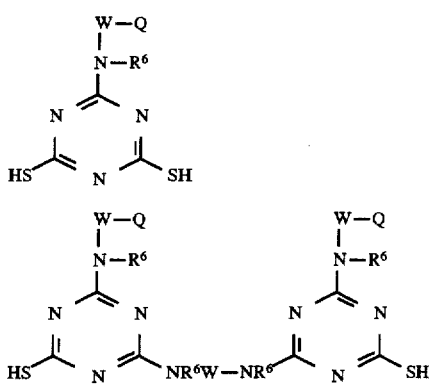

wherein:

each $R^6$ independently is H or optionally substituted alkyl, preferably H or $C_{1-4}$-alkyl;

each W independently is as hereinbefore defined; and each Q is a quaternary amine group.

Preferred quaternary amine groups are as hereinbefore described for the nucleophilic agent. Another preferred nucleophilic agent is of formula Q—W—$CH_2SH$ wherein Q and W are as hereinbefore defined.

Preferably the nucleophilic agent has at least two aliphatic primary or secondary amino groups because this is believed to give a highly substantive polymer in which the dye and nucleophilic agent constitute alternate units.

The aliphatic primary amino group is an amino group of formula —$NH_2$ attached to a nitrogen atom or an aliphatic carbon atom and an aliphatic secondary amino group is a group of formula —NH— attached to two aliphatic carbon atoms or to one aliphatic carbon atom and one nitrogen atom.

It is believed important that the —$NH_2$ and —NH— groups in aliphatic primary and secondary amino groups are attached to aliphatic carbon atoms because attachment to aromatic species (for example phenyl or naphthyl) or to a carbonyl group (—CO—) lowers the nucleophilicity of the —$NH_2$ or —NH— group thereby rendering them less reactive towards groups represented by $V^1$ or $V^2$ in the dye under practical conditions. There may of course be amine groups in the nucleophilic agent which are not aliphatic primary or secondary amino groups provided the nucleophilic agent has at least one group, preferably at least two groups, selected from thiols, thiones, aliphatic primary amino and aliphatic secondary amino groups.

The aliphatic primary amino groups and secondary amino groups may be attached to the same carbon atom, for example as found in guanidine groups such as —NH—C(=NH)—$NH_2$ and —NH—C(=NH)—NH—. In hydrazines there can be one aliphatic primary amino group and one aliphatic secondary amino group, for example as in $CH_3NH$—$NH_2$, two aliphatic secondary amino groups, for example as in $CH_3NH$—$NHCH_3$, or two aliphatic primary amino groups, for example as in $H_2NN(CH_2CH_2)_2NN_2$.

Preferred aliphatic primary amino groups are of the formula —$CH_2$—$NH_2$, —$CH(R^7)$—$NH_2$ and —$C(R\ )_2$—$NH_2$ and preferred aliphatic secondary amino groups are of the formula —$CH_2$—NH—$CH_2$—, —$CH(R^7)$—NH—$CH_2$— and —$CH(R^7)$—NH—$CH(R^7)$— wherein each $R^7$ independently is H or optionally substituted alkyl, aryl or aralkyl, more preferably H or $C_{1-4}$-alkyl, especially H or methyl.

Examples of the nucleophilic agents include compounds having 1 aliphatic primary amino group and no aliphatic secondary amino groups, for example methylamine, ethylamine, propylamine, $H_2NCH_2CH_2SH$; compounds having 2 aliphatic primary amino groups and no aliphatic secondary amino groups, for example $H_2NCH_2CH_2NH_2$, $H_2N(CH_2)_3NH_2$, $H_2N(CH_2)_4NH_2$, $H_2N(CH_2)_6NH_2$, $H_2N(CH_2)_8NH_2$, 1,2- and 1,3-diaminocyclohexane, $H_2NCH(CH_3)CH_2NH_2$, $H_2NCH_2CH(NH_2)CO_2H$, $H_2NCH_2CH(CH_2CH_3)NH_2$, Ph-CH($NH_2$)-CH($NH_2$)-Ph, $H_2NCH_2C(CH_2CH_3)_2CH_2NH_2$, $H_2NCH_2CHOHCH_2NH_2$, $H_2NCH_2COCH_2NH_2$, $H_2NCH_2C(CH_3)_2CH_2NH_2$, $H_2NCH_2CH_2N(CH_2CH_2)_2NCH_2CH_2NH_2$, $H_2N(CH_2)_3N(CH_2CH_2)_2N(CH_2)_3NH_2$, $H_2N(CH_2)_4N(CH_2CH_2)_2N(CH_2)_4NH_2$ and compounds of formula $H_2NCH_2CH_2(OCH_2CH_2)_n NH_2$ wherein n is from 1 to 9; compounds having three aliphatic primary amino groups and no aliphatic secondary amino groups, for example 1,2,3-triaminopropane and ($H_2NCH_2CH_2$)$_3$N; compounds having one aliphatic primary amino group and one aliphatic secondary amino group, for example ($CH_3$)$_2$CH-$NHCH_2CH_2NH_2$, $CH_3NHCH_2CH_2NH_2$, $CH_3CH_2NHCH_2CH_2NH_2$, $HOCH_2CH_2NHCH_2CH_2NH_2$, ($CH_3O$)$_3Si(CH_2)_3NHCH_2CH_2NH_2$, ($CH_3$)$_2NCH_2CH_2N HCH_2CH_2NH_2$, ($CH_3CH_2$)$_2$ $NCH_2CH_2NHCH_2CH_2NH_2$, $PhCH_2NHCH_2CH_2NH_2$, ($CH_3$)$_2CHNHCH(CH_3)CH_2NH_2$, 3-aminopyrrolidine, 3-aminopiperidine, 2-aminomethylpiperidine, $HO_2CCH_2NHCH_2CH_2NH_2$, cyclohexanyl-NH-$CH_2CH_2NH_2$, and $H_2N(CH_2)_3NH(CH_2)_3NHCOCH_3$; compounds having two aliphatic primary amino groups and one aliphatic secondary amino group, for example $H_2N(CH_2CH_2NH)_2H$, $H_2NCH_2CH_2NH(CH_2)_2NH_2$, $H_2NCH_2CH_2NH(CH_2)_4NH_2$ and $NH(CH_2CH(CH_3)$-$NH_2)_2$; Compounds having a least two aliphatic secondary amino groups, especially from 2 to 8 secondary amino groups, for example $HO(CH_2CH_2NH)_2CH_2CH_2OH$, $HO_2CCH_2NHCH_2CH_2NHCH_2CO_2H$, $PhCH_2NHCH_2CH_2NHCH_2Ph$,(—$NHCH_2CH_2$—)$_{3,4}$ or 5, piperazine, 2-methylpiperazine, 2,5- and 2,6-dimethylpiperazine, $H_2N(CH_2CH_2NH)H$ wherein n is 3,4 or 5, $CH_3NHCH_2CH_2NHCH_3$, (—$NHCH_2CH_2CH_2$—)$_4$, 1,4,7,10,13-(6-hexaazacyclooctadecane), ($CH_3O$)$_3Si(CH_2CH_2NH)_2CH_2CH_2CO_2CH_3$ and ($CH_3O$)$_3Si(CH_2CH_2NH)_2CH_2CH_2NH_2$. Nucleophilic agents having a molecular weight of at least 600 include polyethylene imine ("PEI") 600, PEI 1000, PEI 1800, PEI 60,000 and PEI 100,000.

The ratio of dye of Formula (1) to nucleophilic agent by weight is preferably in the range 19:1 to 1:19, more preferably 9:1 to 1:9, especially 3:1 to 1:3. Factors influencing the preferred ratio include the relative molecular weights of the dye and nucleophilic agent, and the number of thiol, thione, aliphatic primary amino and aliphatic secondary amino groups in the nucleophilic agent. Because the dye and nucleophilic agent join together by reaction of the $V^1$ or $V^2$ groups in the dye and the thiol, thione, aliphatic primary amino and aliphatic secondary amino groups in the nucleophilic agent it is preferred that the relative amounts (in moles) of dye and nucleophilic agent is chosen such that the number of electrophilic and the total number of thiol, thione, aliphatic primary amino and aliphatic secondary amino groups is about equal, for example in the range 5:4 to 4:5. However, if one wishes the dye may be used in excess such that reactive groups $V^1$ or $V^2$ are present on the resultant oligomer or polymer which can form covalent bonds with the substrates.

In one embodiment the nucleophilic agent has a molecular weight below 600 and in another the molecular weight is at least 600. It is preferred that the nucleophilic agent has a molecular weight below 600.

In an embodiment of the process according to the sixth aspect of the present invention, the ink composition and the nucleophilic agent are applied to the substrate from separate jets in the ink jet printer head. In this embodiment it is preferred that the nucleophilic agent is applied to the substrate by the ink jet printer as a solution or dispersion in a medium, preferably a liquid medium and more preferably an aqueous medium.

In a further embodiment of the current process, the nucleophilic agent is applied to the substrate as a coating after or, more preferably, prior to application of the ink composition from the ink jet printer.

When the process according to the sixth aspect of the present invention is carried out by heating the ink composition and nucleophilic agent such that they react together, it is preferred that the ink and nucleophilic agent are heated from a first temperature to a second temperature at least 20° C. higher than the first temperature, more preferably at least 30° C. higher, especially at least 40° C. higher and optionally up to 200° C. or 300° C. higher than the first temperature. The first temperature is preferably between 0° C. and 40° C., more preferably between 5° C. and 40° C., especially between 10° C. and 40° C. The ink composition and nucleophilic agent may be heated by any means, for example by an electrical means such as a heating mantle, infra-red, thermal head, microwave or ultrasound or by using steam. The heating may be done at neutral, acid or alkali pH, preferably at a pH above 7. It is preferred that the heating step is performed after the ink composition and nucleophilic agent have been applied to the substrate.

When the present process is performed by basifying the ink composition and nucleophilic agent such that they react together, it is preferred that the basifying is from a first pH to a second pH at least 0.5 pH units higher than the first pH, more preferably at least 1 pH unit higher, especially at least 2 pH units higher, more especially at least 3 pH units higher and optionally up to 7 pH units higher than the first pH. The first pH is preferably between pH 0 and pH 8.5, more preferably between pH 2 and pH 8, especially between pH 4 and pH 8, more especially between pH 6 and pH 8 and especially preferably approximately pH 7.

The ink and nucleophilic agent are preferably basified using an alkaline earth or alkali metal, base or salt, more preferably an alkali metal hydroxide, carbonate or bicarbonate, especially a sodium or potassium hydroxide, carbonate, bicarbonate or mixtures thereof.

The ink and nucleophilic agent are preferably basified such that they react together by:
(a) basifying the ink composition and/or the nucleophilic agent and forming a mixture of the ink and nucleophilic agent on the surface of the substrate. As hereinbefore described, the ink and nucleophilic agent may be applied to the substrate using separate channels in the ink jet printer head. Alternatively, the nucleophilic agent may be applied to the substrate as a surface coating prior to application of the ink composition by the ink jet printer; or
(b) basifying the mixture of the ink composition and nucleophilic agent after they have been applied to the substrate. In this embodiment the mixture is preferably basified by immersing the coated substrate into an alkaline solution or, more preferably by application to the substrate of an alkali metal hydroxide, carbonate or bicarbonate from a separate jet in the ink jet printer head. When an alkali is applied to the substrate using a jet in the ink jet printer, it is preferred that the alkali is applied in a liquid medium, preferably an aqueous medium.

The substrate may be any of the substrates hereinbefore defined for the other aspects of the present invention. Preferred substrates are textile materials, especially natural, synthetic and semi-synthetic materials.

A preferred embodiment of the process according to the sixth aspect of the present invention comprises the steps:
(i) applying a composition comprising the nucleophilic agent and the pre-treatment composition defined in the fourth aspect of the present invention to the substrate;
(ii) applying an ink composition according to the first aspect of the present invention to the substrate using an ink jet printer; and
(iii) heating the substrate at a temperature of from 50° C. to 200° C. to fix the dye on the substrate.

It is preferred that the ink composition according to the first aspect of the present invention and the nucleophilic agent are applied to the substrate as a mixture using an ink jet printer. The mixture of an ink composition according to the first aspect of the present invention and the nucleophilic agent forms a further aspect of the present invention.

Accordingly, a seventh feature of the present invention provides a composition comprising:
(i) an ink composition according to the first aspect of the present invention; and
(ii) a nucleophilic agent having at least one group selected from thiols, thiones, aliphatic primary amino groups and aliphatic secondary amino groups.

The preferred ink compositions and nucleophilic agents contained in the composition are as hereinbefore described in relation to the present process. The preferred ratio of dye of Formula (1) contained in the composition to nucleophilic agent is as hereinbefore described. The composition may contain one or more of the dyes of Formula (1) and one or more of the nucleophilic agents.

A particularly preferred composition comprises:
(a) 0.5 to 20 parts of the dye;
(b) 2 to 60 parts of water-soluble organic solvent(s);
(c) 1 to 95 parts water; and
(d) 1 to 25 parts of the nucleophilic agent;
wherein all parts are parts by weight based upon the total weight of the composition and the parts (a)+(b)+(c)+(d)= 100.

In addition to the parts (a), (b), (c) and (d) the composition may contain other additional components conventionally used in ink formulations as hereinbefore defined for the first aspect of the present invention.

As there is no need to use a free-radical initiator in the coloration processes described above it is preferred that the processes are performed in the absence of such an initiator.

The dyes of Formula (1) may be prepared by condensing a compound of Formula (7):

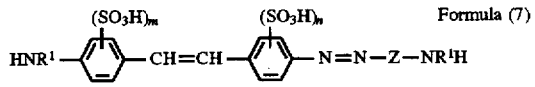

with about two molar equivalents of a compound of Formula (8)

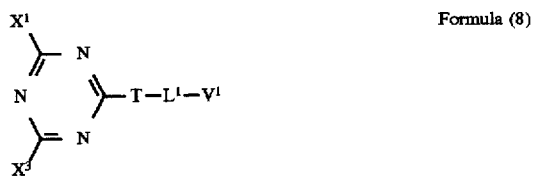

wherein Z, $R^1$, T, $V^1$, $L^1$, $X^1$ m and n are as hereinbefore defined and $X^3$ is a labile group preferably Cl or F.

It is preferred to use about two molar equivalents of the compound of Formula (8) relative to the compound of Formula (7) because using more or less is wasteful of whichever compound is in excess. Normally from 1.5 to 2.5, preferably 1.8 to 2.2, molar equivalents of the compound of Formula (8) is used. The condensation is preferably performed in an aqueous solvent, especially water. A temperature of 20° to 40° C. is preferred, and a reaction time of 2 to 48 hours is convenient.

The compound of Formula (7) may be prepared by diazotising a suitable 4-amino-4'-nitro-stilbene derivative, coupling onto a coupling component, for example an aniline compound and reducing the nitro group. The compound of Formula (8) can be prepared by condensing an appropriate triazine compound with a compound of Formula H-T-L$^1$-V wherein T,L$^1$ and V are as hereinbefore defined.

According to an eighth feature of the present invention there is provided an ink composition obtained by heating or basifying or heating and basifying a composition according to the seventh aspect of the present invention. Preferably the heating and/or basifying is from first to second temperatures and pHs as described hereabove.

The ink composition according to the eighth feature of the present invention contains the polymer or oligomer resulting from the reaction of the dye and nucleophilic agent contained in the composition according to the seventh aspect of the present invention. It is preferred that the polymer is oligomer is dissolved or finely dispersed in the ink composition.

According to a ninth feature of the present invention there is provided a toner resin composition comprising a toner resin and a dye characterised in that the dye is of Formula (1).

The toner resin is a thermoplastic resin suitable for use in the preparation of toner compositions. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, UK 2,090,008, U.S. Pat. Nos. 4,206,064 and 4,407,928.

The toner resin composition preferably contains from 0.1% to 20% of the dye of Formula (1) more preferably from 3% to 10% based on the total weight of the toner resin compositions.

The toner resin composition may be prepared by any method known to the art which typically involves mixing the toner resin with the dye of Formula (1) and optionally a charge control agent (CCA) by kneading in a ball mill above the melting point of the resin. Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

CCA's are more fully described in WO94/23344.

The invention is further illustrated by the following Examples in which all parts and percentages are by weight unless otherwise stated.

EXAMPLE 1

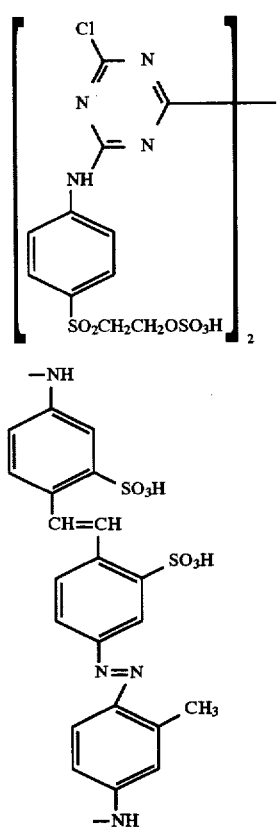

Stage a)

4-Amino-4'-nitro-2,2'-stilbene-disulphonic acid (69% strength, 28 g) was dissolved in ice/water (200 g) and conc. HCl (12 cm$^3$) and NaNO$_2$ solution (2M, 24 cm$^3$) were added dropwise whilst maintaining the temperature below 50° C. After stirring for ½ hour, excess nitrous acid was destroyed using sulphamic acid and 3-methyl aniline (5 g) in acetone (50 cm$^3$) was added. The pH was raised to 5–6 using 2M NaOH and the product was filtered off and dried to give a monoazo solid (29 g).

The monoazo solid (7.0 g) was dissolved in water at pH 8 and a solution of sodium sulphide hydrate (8.7 g) in water (50 cm$^3$) was added. The mixture was stirred for 3 hours, the pH was adjusted to 5 and a 10% w/v salt solution was added. The resultant precipitate was filtered off and dried to give 6.3 g of solid.

Stage b)

A solution of cyanuric chloride (2.28 g) in acetone (100 cm$^3$) was added over 10 minutes to a solution of 4-(p-sulphatoethyl sulphonyl)aniline (3.45 g) in water (100 cm$^3$) at 0°–5° C. After 1 hour the product of stage a) (3.0 g) in water (100 cm$^3$) was added and the mixture was stirred at ambient temperature for 14 hours. A 10% w/v salt solution was added and the resultant precipitate was filtered off, washed with isopropanol and dried to give the title product (5.1 g) having a λmax at 407 nm.

EXAMPLE 2

The method of Example 1 was repeated except that in place of 3-methylaniline there was used 3-methyl-6-methoxy aniline. The resultant product had a λmax at 446 nm.

EXAMPLE 3

The method of Example 1 was repeated except that in place of 3-methylaniline there was used 3-ureido aniline. The resultant product had a $\lambda$max at 423 nm.

EXAMPLE 4

The method of Example 1 was repeated except that in place of 3-methyl aniline there was used 3-acetamido aniline. The resultant product had a $\lambda$max at 421 nm.

EXAMPLE 5

The method of Example 1 was repeated except that in place of 3-methyl aniline there was used 2,4-diamino benzene sulphonic acid. The resultant product had a $\lambda$max at 442 nm.

EXAMPLE 6

The method of Example 1 was repeated except that in place of 3-methyl aniline there was used N-($\beta$-aminoethyl)-2-hydroxy-3-carbonamido-4-methyl pyridone. The resultant product had a $\lambda$max at 456 nm.

EXAMPLE 7

The method of Example 1 was repeated except that in place of 3-methyl aniline there was used 1-(2-methyl-3-amino-5-sulphophenyl)-3-carboxypyrazol-5-one. The resultant product had a $\lambda$max at 446 nm.

EXAMPLE 8

The method of Example 1 was repeated except that in place of 3-methyl aniline there was used 1-(4-aminophenyl)-3-methyl-pyrazol-5-one. The resultant product had a $\lambda$max at 436 nm.

EXAMPLE 9

The method of Example 1 was repeated except that in place of $\beta$-methyl aniline there was used 1-(4-aminophenyl)butanedi-1,3-one. The resultant product had a $\lambda$max at 416 nm.

EXAMPLE 10

The method of Example 1 was repeated except that in place of 4-($\beta$-sulphatoethylsulphonyl)aniline there was used 4-amino-N- ($\beta$-sulphatoethyl)phenyl sulphonamide. The resultant product had a $\lambda$max at 420 nm.

EXAMPLE 11

Ink jet printing inks containing dyes described in the foregoing examples may be prepared according to the following formulations shown in Table 1 wherein the figures denote parts by weight for each stated component:

The following abbreviations are used:

PG=propylene glycol;

DEG=diethylene glycol;

NMP=N-methyl pyrollidone;

DMK=dimethylketone;

IPA=isopropanol;

MEOH=methanol;

2P=2-pyrollidone

MIBK=methylisobutyl ketone

CET=Cetyl ammonium bromide (a surfactant)

BAS=1:1 mixture by weight of ammonia and methylamine;

PHO=$Na_2HPO_4$.

| Dye From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 1 | 2.0 | 80 | 5 | | 6 | 4 | | | | | 5 | | 3 |
| 2 | 3.0 | 90 | | 5 | 2 | | 0.2 | | | | | | |
| 3 | 1.0 | 85 | 5 | | 2 | 2 | | 0.1 | | 5 | 1 | | |
| 4 | 2.1 | 91 | | 8 | | | | | | | | 1 | |
| 5 | 3.1 | 86 | 5 | | | | | 0.2 | 4 | | 5 | | |
| 6 | 1.1 | 81 | | | 9 | | 0.5 | 0.5 | | 9 | | | |
| 3 | 2.5 | 60 | 4 | 15 | 3 | 3 | | | 6 | 10 | 5 | 4 | |
| 5 | 1.9 | 70 | | 20 | | | | | 10 | | | | |
| 6 | 2.4 | 75 | 5 | 4 | | | | | | 6 | | 5 | 5 |
| 8 | 4.1 | 80 | 3 | 5 | 2 | 10 | | 0.3 | | | | | |
| 6 | 3.2 | 65 | | 5 | 4 | 6 | | | 5 | 4 | 6 | 5 | |
| 9 | 4.6 | 96 | | | | | | | | 4 | | | |
| 10 | 0.8 | 90 | 5 | | | | | | 5 | | | | |
| 2 | 1.2 | 80 | 2 | 6 | 1 | 5 | | | 1 | | 4 | | 1 |
| 1 | 1.8 | 80 | | 5 | | | | | | | 15 | | |
| 3 | 2.6 | 84 | | | 11 | | | | | | 5 | | |
| 2 | 3.3 | 80 | 2 | | | 10 | | | | 2 | | 6 | |
| 5 | 1.7 | 90 | | | 7 | | 0.3 | | 3 | | | | |
| 1 | 1.5 | 69 | 2 | 20 | 2 | 1 | | | | | 3 | 3 | |
| 1 | 1.6 | 91 | | | 4 | | | | | | 4 | | 1 |

EXAMPLE 12

The ink compositions shown in Table 1 may be applied to a textile material such as cotton using an ink jet printer. Preferably the textile is pre-treated with a composition comprising:

2.5 parts sodium bicarbonate;

15 parts of a 10% aqueous solution of sodium alginate thickening agent;

15 parts of urea;

47.5 parts of water; and 20 parts of Composition A shown in Table 2.

TABLE 2

| Composition A | |
|---|---|
| Component | Parts by Weight |
| Urea | 25 |
| Distearyl Dimethyl Ammonium Chlorine | 2.3 |
| Isopropyl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |
| Acetic Acid (80%) | 0.05 |
| Water | 69.0 |

The textile material should be thoroughly soaked with the pre-treatment composition in a padding bath and the excess liquor removed by mangling. The material should be dried in hot air at 100° C. prior to application of the inks shown in Table 2 by an ink jet printer.

EXAMPLE 13 TO 18

The ink compositions shown in Table 1 may be applied to a substrate, preferably a textile, said substrate being pre-treated with a composition B comprising the pre-treatment composition described in Example 12 and the nucleophilic agent shown in Table 3. In Table 3, the parts by weight refer to parts based upon the total weight of the composition applied to the textile material.

TABLE 3

| Pre-treatment composition B | | | |
|---|---|---|---|
| Example | Nucleophilic Agent | Parts by weight of nucleophilic agent | Pre-treatment composition from Example 12 (Parts) |
| 13 | ethylamine | 18 | 82 |
| 14 | ethylenediamine | 10 | 90 |
| 15 | piperazine | 12 | 88 |
| 16 | trithiotriazine | 8 | 92 |
| 17 | 2-aminoethanethiol | 15 | 85 |
| 18 | | | |

After applying the ink composition to the substrate, the substrate may be heated at a temperature of from 60° to 90° C. to fix the dye on the substrate.

(ii) a dye of Formula (1) or salt thereof:

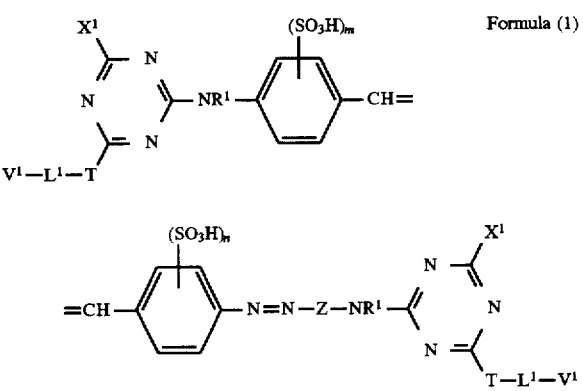

wherein each $X^1$ independently is a labile or non-labile substituent;

each T independently is —O—, —S— or —NR$^1$—;

each $L^1$ independently is a divalent organic linker group;

each $V^1$ independently is a group which is capable of undergoing an addition reaction or an elimination and addition reaction;

each $R^1$ independently is H or optionally substituted alkyl;

Z is the residue of a coupling component; and m and n are each independently 0 or 1.

2. An ink composition according to claim 1 wherein $V^1$ is a vinyl sulphone group or a group which is convertible to vinyl sulphone on treatment with an aqueous alkali or a group of the formula —SO$_2$NHCH$_2$CH$_2$—Y wherein Y is —OSO$_3$H, —SSO$_3$H, —Cl or —OCOCH$_3$.

3. An ink composition comprising a medium and a dye of the Formula (2) or a salt thereof:

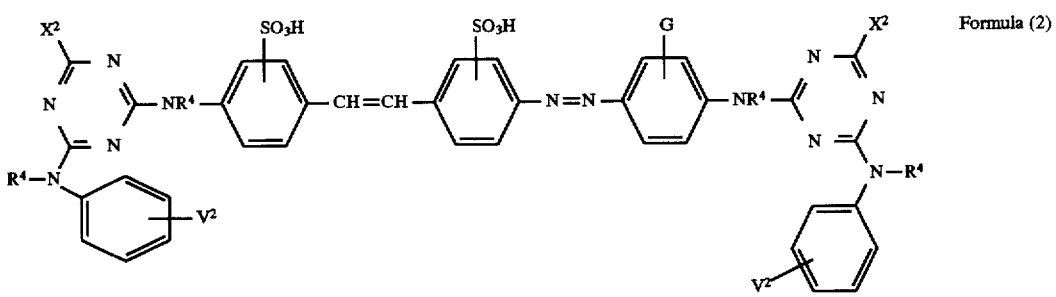

We claim:

1. An ink composition comprising (i) a medium comprising a mixture of water and one or more water-soluble organic solvent(s), an organic solvent, or a low melting point solid; and wherein:

each $R^4$ independently is H or $C_{1-4}$-alkyl;

G is H, alkyl, alkoxy, amido, ureido, halo, nitro, carboxy, amino or sulpho;

each $X^2$ independently is F, Cl, a quaternary ammonium group or a non labile group; and each $V^2$ independently is a vinyl sulphone group or a group which is convertible to a vinyl sulphone group on treatment with aqueous alkali, a group of formula —$SO_2NHCH_3CH_2$—Y wherein Y is —$OSO_3H$, —$SSO_3H$, —Cl or —$OCOCH_3$, or a group or formula —$NHCOCR^4$=$CH_2$ or —$NHCOCBr$=$CH_2$; and the medium is as defined in claim 1.

4. An ink composition according to claim 3 wherein $X^2$ is F, Cl or a quaternary ammonium group.

5. An ink composition according to any one of the preceding claims wherein the medium comprises water and one or more water-soluble organic solvent(s).

6. An ink composition according to any one of claims 1 to 4 comprising:

(a) 0.5 to 20 parts of the dye;

(b) 2 to 60 parts of water-soluble organic solvent(s); and (c) 1 to 95 parts of water;

wherein all parts are by weight based upon the total weight of the ink and the parts (a)+(b)+(c)=100.

7. A process for printing a substrate with an ink composition comprising forming the ink composition into small droplets by ejection from a reservoir through a small orifice so that the droplets of ink are directed at a substrate wherein the ink composition is as defined in any one of claims 1 to 4.

8. A paper, an overhead projector slide or a textile material printed by means of the process according to claim 7.

9. A process for the coloration of a textile material with an ink composition according to any one of claims 1 to 4 which comprises the steps:

i) applying the ink composition to the textile material by ink jet printing; and ii) heating the textile material at a temperature from 50° C. to 250° C. to fix the dye on the material.

10. A process for the coloration of a substrate comprising applying to the substrate:

(i) an ink compostion according to any one of claims 1 to 4 by forming the ink composition into small droplets by ejection from a reservoir through a small orifice so that the droplets of ink are directed at a substrate; and (ii) a nucleophilic agent; and heating and/or basifying the ink and nucleophilic agent thereby causing the dye present in the ink and the nucleophilic agent to react together.

11. A process according to claim 10 wherein the nucleophilic agent contains at least one group selected from the group consisting of thiols, thiones, aliphatic primary amino groups and aliphatic secondary amino groups.

12. A process according to claim 10 wherein the nucleophilic agent has a molecular weight below 600.

13. A process according to claim 11 wherein the nucleophilic agent has a molecular weight below 600.

14. A process according to claim 10 wherein the nucleophilic agent is applied to the substrate by an ink jet printer.

15. A composition comprising:

(i) an ink composition according to any one of claims 1 to 4; and (ii) a nucleophilic agent having at least one group selected from the group consisting of thiols, thiones, aliphatic primary amino groups and aliphatic secondary amino groups.

16. A composition according to claim 15 wherein the nucelophilic agent has a molecular weight below 600.

17. A composition according to claim 15 comprising:

(a) 0.5 to 20 parts of the dye of Formula (1);

(b) 2 to 60 parts of water soluble organic solvent(s);

(c) 1 to 95 parts water; and (d) 1 to 25 parts of the nucleophilic agent;

wherein all parts are parts by weight based upon the total weight of the composition and the parts (a)+(b)+(c)+(d)=100.

18. A composition according to claim 17 wherein the nucleophilic agent has a molecular weight below 600.

19. An ink composition obtained by heating or basifying or heating and basifying a composition according to claim 15.

20. A toner resin composition comprising a toner resin and a dye, wherein the dye is of Formula (1) or Formula (2) as defined in any one of claims 1 to 4.

* * * * *